United States Patent [19]

Drake

[11] 4,331,557

[45] May 25, 1982

[54] REGENERATION OF RUTHENIUM-CONTAINING CATALYST

[75] Inventor: Charles A. Drake, Bartlesville, Okla.

[73] Assignee: Phillips Petroleum Company, Bartlesville, Okla.

[21] Appl. No.: 152,229

[22] Filed: May 22, 1980

[51] Int. Cl.$^3$ .................. B01J 23/96; B01J 21/20; C07C 87/14

[52] U.S. Cl. .................. 252/411 R; 564/489; 564/490; 564/491; 564/492; 564/493

[58] Field of Search .................. 252/411 R, 411 S

[56] References Cited

U.S. PATENT DOCUMENTS

| | | | |
|---|---|---|---|
| 3,211,668 | 10/1965 | Yamamoto | 252/411 R |
| 3,238,120 | 3/1966 | Sale | 208/111 |
| 3,346,484 | 10/1967 | Lewis | 252/411 R |
| 3,592,840 | 7/1971 | Durston | 252/416 |
| 3,893,942 | 7/1975 | Yang | 252/411 R |
| 3,896,174 | 7/1975 | Drake | 260/583 P |
| 4,053,515 | 10/1977 | Drake | 260/583 P |

*Primary Examiner*—P. E. Konopka

[57] ABSTRACT

A ruthenium-containing catalyst is regenerated after use for an organic chemical treatment, e.g., hydrogenation, dehydrogenation, isomerization, disproportionation, hydrocracking, etc., at an elevated temperature and at a considerably reduced pressure of the order of about 600 mm Hg and much lower of the order of about 0.001 mm Hg.

3 Claims, No Drawings

4,331,557

REGENERATION OF RUTHENIUM-CONTAINING CATALYST

BRIEF SUMMARY OF THE INVENTION

A ruthenium-containing catalyst, e.g., a catalyst suitable for reactions such as hydrogenation, dehydrogenation, isomerization, disproportionation, hydrocracking, and the like, is regenerated at an elevated temperature but at a considerably reduced pressure, e.g., a pressure in the approximate range of from about 0.001 to about 600 millimeters Hg, preferably at a pressure below about 100 millimeters Hg, say, a pressure in the range of from about 0.1 to about 10 millimeters Hg.

DETAILED DESCRIPTION

This invention relates to the regeneration of a used, at least partially deactivated, ruthenium catalyst, e.g., a supported ruthenium catalyst. In one of its aspects, the invention relates to a process for the regeneration of a ruthenium catalyst upon a suitable support. In a further aspect of the invention, it relates to the reuse of a ruthenium catalyst as herein described following a regeneration as herein described.

In one of its concepts the invention provides a process for the regeneration of a used ruthenium catalyst, as herein described, wherein the used catalyst is regenerated, preferably in the absence of any substantial amount of oxygen, at an elevated temperature and at a substantially reduced pressure. In another of its concepts the invention provides a process for the regeneration of a used ruthenium catalyst, e.g., ruthenium on a suitable support, as herein described, in an atmosphere having little or no oxygen and at a pressure appreciably and preferably substantially below atmospheric at a temperature sufficient to accomplish regeneration at such pressure.

I have descovered that the regeneration of a used ruthenium catalyst at a reduced pressure, as herein described, will give good yields of product upon reuse even after several uses and concommitant regenerations.

It is an object of this invention to provide a process for the regeneration of a ruthenium catalyst. It is another object of this invention to provide a process for the regeneration of a ruthenium catalyst for reuse without substantial loss of yield of product over that obtained upoon first use of the fresh catalyst to produce the same product.

It is a further object of the invention to provide an improved process for the regeneration of a ruthenium-containing catalyst.

Other aspects, concepts, objects, and the several advantages of the invention are apparent from a study of this disclosure and the appended claims.

According to the present invention, a ruthenium-containing catalyst is regenerated at an elevated temperature and at a reduced pressure preferably in an inert atmosphere.

Thus the present invention provides a process for the regeneration of a used, at least partially deactivated, supported ruthenium catalyst by a treatment at elevated temperatures and reduced pressures. In addition, this invention involves a process for the use of a supported ruthenium catalyst in a catalytic reaction, the regeneration of the at least partially deactivated catalyst at elevated temperatures and reduced pressures, and the reuse of the regenerated catalyst in a catalytic reaction.

Supported ruthenium catalysts are known to be useful for catalyzing chemical conversions such as hydrogenation, dehydrogenation, isomerization, disproportionation, hydrocracking, and the like.

However, for commercial use it is important that the catalyst be capable of regeneration to allow repeated use of the expensive metal. Supported ruthenium catalysts have been found to be difficult to regenerate. Although the reason for this regeneration problem is not firmly established, it has been suggested that during the attempted regeneration the ruthenium metal migrates to form large crystallites with a reduced metal surface area and a reduced activity.

The ruthenium catalysts suitable for regeneration by the process of this invention are supported ruthenium catalysts. The catalyst support or carrier can be any solid support which does not deleteriously affect the catalytic process. Examples of supports include carbon, kieselguhr, silica, alumina, silica-alumina, calcium carbonate, barium carbonate, pumice, clays, and the like, and mixtures thereof. For reasons of economics, stability, and inertness, the presently preferred support is alumina. The support can be in the form of spheres, pellets, extrudates, tablets, granules, and the like, and mixtures thereof. The size of the catalyst support will be any size suitable for the particular catalytic reaction and equipment.

The amount of ruthenium present on the support can vary widely depending on the specific catalytic reaction. In general, the supported ruthenium catalyst will contain ruthenium in the range from about 0.01 to about 50 weight percent and preferably in the range of about 0.1 to about 20 weight percent, based on the weight of the support.

The supported ruthenium catalyst can be prepared by any of the methods well known in the art. The ruthenium catalyst can be added to the support as the finely divided elemental ruthenium or compounds of ruthenium which are reducible by hydrogen to finely divided elemental ruthenium. Suitable reducible compounds include ruthenium oxide, ruthenium chloride, ruthenium nitrate, ruthenium acetate, ruthenium carbonate, ruthenium hydroxide, and the like. The ruthenium catalyst can be added to the support by any of a variety of methods. For example, the supported catalysts can be prepared by dry mixing the components or by impregnating the support with a solution or a dispersion of ruthenium in elemental form or in the form of reducible compounds thereof. The supported catalyst can be pretreated with hydrogen to reduce the compounds, or such reduction can be achieved in the hydrogenation reactor. Examples of supported catalysts include 0.5 percent ruthenium on alumina, 1 percent ruthenium on alumina, 10 percent ruthenium on alumina, 5 percent ruthenium on carbon, 15 percent ruthenium on silica, 3 percent ruthenium on kieselguhr, and 6 percent ruthenium on calcium carbonate. Promoters or activators, such as chromium, palladium, silver, manganese, and the like can be present in the supported catalyst if desired.

The catalyst regeneration process of this invention is carried out by treating the supported ruthenium catalyst at elevated temperatures and reduced pressures.

Any regeneration temperature, which can be determined by testing, can be employed which provides the desired degree of renewed catalytic activity. The regeneration temperature, generally, will be broadly within the range from about 30° to about 600° C. At temperatures below about 30° C., the regeneration will normally be unacceptably slow, while at temperatures above about 600° C., some supported catalysts may be physically damaged. For reasons of economy and effectiveness, the preferred regeneration temperatures are within the range of from about 100° C. to about 450° C., and more preferably within the range of from about 150° C. to about 350° C.

The reduced pressure employed during the catalyst regeneration will be broadly between about 0.001 and about 600 mm Hg (0.00133 to 800 Pascals-Pa). Reduced pressures below about 0.001 mm Hg (0.00133 Pa) are difficult to achieve on a large scale and pressures above about 600 mm Hg (800 Pa) are believed to be relatively inefficient. For reasons of economy and effectiveness, the presently preferred regeneration pressures are within the range of about 0.01 and about 100 mm Hg (0.0133 to 133 Pa), more preferably within the range of about 0.1 to about 10 mm Hg (0.133 to 13.3 Pa). The low absolute pressure during the treatment is a basic concept of this invention.

The time interval for catalyst regeneration will be any time interval which provides the desired degree of renewed catalytic activity. Normally shorter regeneration times will be used with higher temperatures and lower pressures, while longer regeneration times will be used with lower temperatures and higher pressures. Within these general guidelines, the regeneration times will generally be from about a few minutes to about 25 hours and preferably within the range of about 1 hour to about 10 hours.

The catalyst regeneration can be carried out in any chamber or device capable of withstanding the regeneration temperature and reduced pressure.

Although the presence of oxygen during the regeneration has not been established as harmful to the regeneration, it is preferred that the regeneration be carried out in the substantial absence of oxygen. Such techniques as preflushing the regeneration chamber with a relatively inert gas such as nitrogen or helium can be employed. Such gases as nitrogen, helium, argon, and hydrogen will usually be present during the regeneration. It is also preferred that the reduced pressure and such gases be maintained on the regenerated catalyst while the catalyst is being cooled.

The ruthenium catalyst regeneration is followed by a reduction step in the presence of hydrogen at about 100° to about 600° C. for a time interval of a few minutes to about 10 hours.

Supported ruthenium catalysts suitable for regeneration by the process of this invention are employed in a wide variety of chemical and petroleum processes such as hydrogenation, isomerization, cyclization, dehydrogenation, hydrocracking, and the like.

The supported ruthenium cataysts regenerated by the process of this invention are especially useful for hydrogenation reactions. Functional groups which can be hydrogenated include acetylenic, olefinic, nitrile, carbonyl, aromatic, and the like, and mixtures thereof.

Specific examples of hydrogenation reactions include the conversion of acetylene to ethane, propene to propane, cyclohexene to cyclohexane, adiponitrile to hexamethylenediamine, acrylonitrile to 1-propylamine, cyclohexanone to cyclohexyl alcohol, butyraldehyde to 1-butanol, benzene to cyclohexane, and toluene to methylcyclohexane.

The currently preferred hydrogenation substrate for use with the supported ruthenium catalyst are branched-chain unsaturated aliphatic dinitriles of the formula:

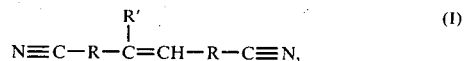

wherein each R is independently selected from the group consisting of an alkylene radical and an alkylidene radical and R' is an alkyl radical. Each R will generally have from one to fifteen carbon atoms, preferably from one to six, and more preferably from one to three carbon atoms. R' will generally have from one to 15 carbon atoms, preferably from one to six carbon atoms, and more preferably from one to three carbon atoms. In general, the unsaturated dinitrile reactant of formula (I) will contain from seven to 30 carbon atoms, preferably from eight to 16 carbon atoms, and more preferably from nine to 12 carbon atoms.

Representative of unsaturated reactant species of formula (I) include such compounds as

| | |
|---|---|
| 4-methyl-3-hexenedinitrile, | 4-ethyl-3-hexenedinitrile, |
| 5-methyl-4-nonenedinitrile, | 5-ethyl-4-decenedinitrile, |
| 7-methyl-6-tridecenedinitrile, | 7-methyl-6-pentadecenedinitrile, |
| 1,2-dimethyl-12-tetracosenedinitrile, | 10-hexyl-9-tetracosenedinitrile, |
| 2,3-dimethyl-3-hexenedinitrile, | 2,4,6-trimethyl-3-heptenedinitrile, |
| 4-ethyl-6,7-dimethyl-3-octenedinitrile, | |
| 2,4,6-triethyl-3-octenedinitrile, | |
| 2-ethyl-4,6-dipropyl-3-octenedinitrile, | |
| 2-methyl-4,6,8,10-tetrapropyl-3-dodecenedinitrile, | |
| 2,4,7,9,11,13,15-heptaethyl-6-hexadecenedinitrile, | | and mixtures thereof.

If desired, other unsaturated dinitrile reactants can be present and effectively hydrogenated during the hydrogenation of the unsaturated dinitriles of formula (I). Thus, in addition to the unsaturated dinitrile reactants of formula (I), the dinitrile feedstock can contain one or more unsaturated dinitrile reactants of the formula:

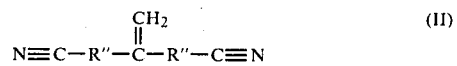

wherein each R'' is independently selected from the group consisting of an alkylene radical and an alkylidene radical. In general, each R'' will have from one to 15 carbon atoms, preferably from one to seven carbon atoms, and more preferably from one to four carbon atoms. The dinitriles of formula (II) will generally contain from six to 30 carbon atoms, preferably from eight to 16 carbon atoms, and more preferably from nine to 12 carbon atoms. Representative unsaturated dinitrile reactants of formula (II) include such compounds as

| | |
|---|---|
| 3-methylenehexanedinitrile, | 4-methyleneheptanedinitrile, |
| 5-methylenenonanedinitrile, | 6-methyleneundecanedinitrile, |
| 7-methylenetridecanedinitrile, | 8-methylenepentadecanedinitrile, |
| 12-methylenetetracosanedinitrile, | |
| 15-methylenenonacosanedinitrile, | |

-continued 2-methyl-3-methylenepentanedinitrile,
2,4-dimethyl-3-methylenepentane-
  dinitrile,
2-methyl-4-methyleneoctanedinitrile,
2-methyl-7-ethyl-4-methyleneoctane-
  dinitrile,
2,4,8-trimethyl-6-methylenedodecane-
  dinitrile,
2,4,8,10-tetrapropyl-6-methylenedo-
  decanedinitrile,
2,26-dimethyl-14-methyleneheptacosane-
  dinitrile, and mixtures thereof.

Unsaturated dinitriles having a structure other than that of formulas (I) and (II) can be present during the hydrogenation reaction, if desired. Similarly, other compounds which may be found in the feed source of the dinitriles of formulas (I) and (II) can be present so long as such additional compounds do not significantly adversely affect the hydrogenation of the dinitriles of formulas (I) and (II). Where other dinitriles are present in the feedstock, the dinitriles of formula (I) will generally constitute at least 0.1 weight percent of the total dinitriles.

A presently most preferred branched-chain unsaturated aliphatic dinitrile feedstock is the dinitrile reaction product mixture obtained by the reaction of isobutylene and acrylonitrile. This dinitrile reaction product mixture is obtained by the reaction of isobutylene and acrylonitrile. This dinitrile reaction product mixture generally comprises 5-methyl-4-nonenedinitrile, 2,4-dimethyl-4-octenedinitrile, 2,4-dimethyl-3-octenedinitrile, 2,4,6-trimethyl-3-heptenedinitrile, 5-methylenenonanedinitrile, 2-methyl-4-methyleneoctanedinitrile, and 2,6-dimethyl-4-methyleneheptanedinitrile. The first four named compounds in this mixture are of the type of formula (I), while the last three named compounds in the mixture are of the type of formula (II). The weight ratio of the dinitriles of formula (I) to the dinitriles of formula (II) in this mixture is generally in the range of about 10:1 to about 1:10.

The catalytic hydrogenation of the unsaturated dinitrile reactant of formula (I) results primarily in the formation of saturated diamine reaction products having the formula:

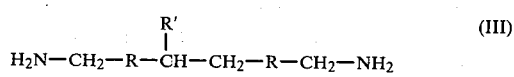
(III)

wherein R and R' are as previously defined. The catalytic hydrogenation of an unsaturated dinitrile reactant of formula (II) results primarily in the formulation of saturated diamine reaction products having the formula:

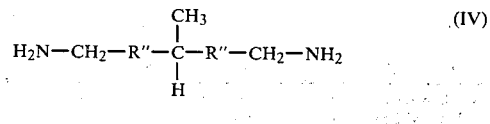
(IV)

wherein R" is as previously defined.

The reaction conditions used for the catalytic reaction with the supported ruthenium catalyst will generally be those conditions known in the art to provide the desired reaction. When the supported ruthenium catalyst is to be used for the hydrogenation of the presently preferred substrates—branched-chain unsaturated aliphatic dinitriles—the following reaction conditions are suitable.

The hydrogenation temperatures will generally be in the range from about 30° to about 250° C., preferably from about 70° to about 200° C. Hydrogen pressures employed will be broadly from about 100 to about 5000 psig (689 to 34470 kiloPascals gauge-kPa), preferably from about 500 to about 3000 psig (3447 to 20682 kPa).

Any time interval suited for the catalytic hydrogenation of branched-chain unsaturated aliphatic dinitriles can be employed. However, time intervals economically attractive to the process are generally within the range of about 15 minutes to about 5 hours for a batch hydrogenation process. A reaction time in the range of about 1 to about 3 hours is presently preferred. The catalytic hydrogenation of unsaturated dinitriles can be carried out as a continuous process at any suitable liquid hourly space velocity (LHSV). However, the liquid hourly space velocity rates will generally be within the range of about 0.1 to about 20, more preferably from about 0.5 to about 10, volumes of unsaturated dinitrile reactant plus diluent and ammonia per volume of catalyst (including the volume of the catalyst support) per hour.

Diluents employed in the hydrogenation of branched-chain unsaturated aliphatic dinitriles are usually selected from aliphatic tertiary alcohols, acyclic and cyclic ethers, and saturated hydrocarbons. Examples include 2-methyl-2-propanol, 2-methyl-2-butanol, dipropyl ether, 1,4-dioxane, dodecane, cyclododecane, and the like, and mixtures thereof. To facilitate handling to the reaction mixtures, the weight ratio of unsaturated dinitrile reactants to diluent charged to the reaction zone is generally within the weight ratio range of about 0.001:100 to about 15:100, and is preferably in the range of about 0.1:100 to about 12:100.

A secondary amine formation suppressant, preferably ammonia, is employed as a means of suppressing undesirable side reactions such as the formation of secondary and tertiary amines. Any amount of secondary amine formation suppressant can be employed which is effective in deterring or reducing undesirable side reactions. In general, the mole ratio of secondary amine formation suppressant to cyano group (there being two cyano groups in each unsaturated dinitrile) will be in the range of about 1:1 to about 25:1, and preferably will be in the range of about 7:1 to about 15:1.

Recovery of the desired end product from the hydrogenation of branched-chain unsaturated dinitriles, the branched-chain saturated aliphatic diamines, as well as any resulting reaction byproducts, any unconsumed reactants, ammonia, hydrogen, and/or diluents can be carried out by any conventional separation means. In general, at the conclusion of the catalytic hydrogenation process in a batch process, the reaction zone effluent is cooled and depressurized with the recovery, if desired, of any ammonia or diluent which is vented from the reaction zone effluent is cooled and depressurized with the recovery, if desired, of any ammonia or diluent which is vented from the reaction zone effluent during the depressurization operation. The ammonia or diluent can be returned or recycled to the hydrogenation zone if desired. The reaction products can be separated from the catalyst by conventional filtration means. The filtrate containing the saturated diamines can be conveniently separated from any reaction byproducts or any diluent remaining in the filtrate by any conventional fractional distillation.

In a continuous process, the reactor effluent is depressured and the diluent and ammonia removed by distillation. The recovered diluent and ammonia can be recycled to the hydrogenation zone, if desired. The saturated diamines can be separated from any reaction byproducts or any remaining diluent by any conventional fractional distillation.

The saturated diamine products obtained by the hydrogenation of unsaturated dinitriles are useful in the preparation of polymers. Of particular interest are the polyamides. The terephthalamide polymers have been found to be of value for the production of fibers and engineering plastics.

Hexamethylenediamine, obtained by the hydrogenation of adiponitrile, is useful as a component of nylon 6,6. Cyclohexanol, obtained from cyclohexanone by hydrogenation, has been used as a solvent and in the manufacture of insecticides. The hydrogenation of benzene yields cyclohexane, which is useful as a solvent and in the preparation of adipic acid (a component of nylon 6,6).

The dehydrogenation of 2-hydroxycyclohexanone produces pyrocatechol (1,2-benzenediol) which has been used in photography and in the dyeing of fur. Steam cracking fractions containing hydrocarbons can by hydrocracked over supported ruthenium catalysts to form benzene and toluene which are well-known as valuable industrial chemicals.

EXAMPLES

The starting material in each of the runs in the examples is a mixture of olefinically unsaturated dinitriles prepared by the reaction of isobutylene and acrylonitrile. This reaction mixture contains about 52 weight percent 5-methylenenonanedinitrile, about 35 weight percent 5-methyl-4-nonenedinitrile, about 12 weight percent of the combination of 2,4-dimethyl-4-octenedinitrile, 2-methyl-4-methyleneoctanedinitrile, and 2,4-dimethyl-3-octenedinitrile, and about 1 weight percent of the combination of 2,6-dimethyl-4-methyleneheptanedinitrile and 2,4,6-trimethyl-3-heptenedinitrile. For simplicity, the above described reaction mixture will be called diadduct. Hydrogenation of both the olefinic and the nitrile unsaturation of diadduct yields a mixture of saturated diamines.

In each hydrogenation run, a 0.5" (12.7 mm) diameter×20" (508 mm) length continuous reactor fitted with a steam heating system and temperature recorder was charged with 20 g of the supported catalyst, flushed with nitrogen, flushed with hydrogen at a rate of 1 liter per minute, and heated to 140° C. A mixture containing diadduct, 2-methyl-2-propanol, and ammonia in a weight ratio of 1/8/1 was fed to the reactor at a LHSV of about 6. The reactor conditions during the hydrogenation runs were 1500 psig (10.3 MPa) pressure, 140° C., and 1 liter per minute hydrogen flow.

Samples were collected from the reactor effluent after 4 hours of run time and after 19 hours of run time and were analyzed by vapor phase chromatography after removal of the 2-methyl-2-propanol and ammonia under reduced pressure. The run results are expressed as a weight percent saturated diamines present in the product mixture at the indicated time in the run with the percentage based on the product weight after removal of the 2-methyl-2-propanol and ammonia.

The catalyst used in the examples was a commercial catalyst containing 0.5 weight percent ruthenium (Ru) on a α-alumina in the form of a 1/16" extrudate. The percentage is based on the support weight.

During the reduced pressure regenerations, the catalyst was held in a 1" (2.6 cm) diameter×6" (15 cm) length quartz tube. Cooling from the regeneration temperature was carried out under reduced pressure.

EXAMPLE I

A control run was carried out to demonstrate the results of a conventional thermal oxidative treatment for the attempted regeneration of a ruthenium catalyst. A fresh Ru on alumina catalyst was utilized in run 1 in the hydrogenation of diadduct for 19 hours. The amount of saturated diamines present in the product mixture after 4 hours of run time was 76% and after 19 hours was 56%. The catalyst was regenerated by heating in nitrogen at 300° C. for 3 hours, in a nitrogen-oxygen mixture (1 volume % $O_2$) at 300° C. for 2 hours, and then in another nitrogen-oxygen mixture (2 volume % $O_2$) at 300° C. for 5 hours. Following this regeneration procedure, the catalyst was reduced in the presence of hydrogen at 400° C. for 3 hours.

The regenerated catalyst was utilized in run 2 in another hydrogenation of diadduct. The amount of saturated diamines present after 4 hours was 37% and after 19 hours was below 25% compared with 76% and 56% respectively, obtained with the fresh catalyst. These results show that a conventional thermal oxidative regeneration procedure is ineffective for the regeneration of a supported Ru catalyst.

EXAMPLE II

A series of runs was carried out to demonstrate the regeneration procedure of the present invention. In each run, a Ru on alumina catalyst was used for the continuous hydrogenation of diadduct for a total of 19 hours. In run 3, a fresh catalyst was used. At the conclusion of run 3, the used catalyst was regenerated in a vacuum oven at 250° C. and 1.0 mm Hg (1.333 Pa) for 3 hours. The catalyst was reduced in the presence of hydrogen at 400° C. for 3 hours and then used in run 4. The used catalyst from run 4 was regenerated and reduced as described above and then used in run 5. The used catalyst from run 5 was regenerated and reduced as described above and then used in run 6. The results of runs 3, 4, 5, and 6 are shown in Table I.

TABLE I

| Run No. | Catalyst Treatment | Saturated Diamines, Wt. %[a] | |
|---|---|---|---|
| | | After 4 hours | After 19 hours |
| 3 | Fresh Catalyst | 76 | 56 |
| 4 | Vacuum Regeneration | 74 | 51 |
| 5 | Vacuum Regeneration | 75 | 55 |
| 6 | Vacuum Regeneration | 67 | 49 |

[a]Weight percent saturated diamines present in the product mixture after removal of the 2-methyl-2-propanol and ammonia.

The results in Table I show that the vacuum regeneration process of the present invention is effective for the regeneration of a used, supported ruthenium catalyst through several regenerations. After 3 regenerations, the yield of saturated diamines had decreased somewhat.

EXAMPLE III

Two more runs were carried out to demonstrate the regeneration process of the present invention using a vacuum level different from that of Example II. In runs 7 and 8, a Ru on alumina catalyst was used for the continuous hydrogenation of diadduct for a total of 19 hours. In run 7, a fresh catalyst was used. At the conclusion of run 7, the used catalyst was regenerated as earlier described in a vacuum oven at 250° C. and 20 mm Hg (26.66 Pa) for 3 hours. The catalyst was then reduced in the presence of hydrogen at 400° C. for 3 hours and used in run 8. The results of these runs are presented at Table II.

TABLE II

| Run No. | Catalyst Treatment | Saturated Diamines, Wt. %[a] | |
|---|---|---|---|
| | | After 4 hours | After 19 hours |
| 7 | Fresh Catalyst | 73 | 50 |
| 8 | Vacuum Regeneration | 49 | 36 |

[a]See footnote [a] of Table I.

These results indicate that the vacuum regeneration using 20 mm Hg is less effective than the regenerations in Example II at 1 mm Hg, but is an improvement over the control run in Example I.

Reasonable variation and modification are possible within the scope of the foregoing disclosure and the appended claims to the invention the essence of which is that a ruthenium-containing catalyst is subjected to an improved regeneration, the regeneration being effected at a substantially reduced pressure, as herein described.

I claim:

1. A process for the regeneration of a used ruthenium-containing hydrogenation catalyst, wherein the used catalyst results from the hydrogenation of a branched-chain unsaturated aliphatic dinitrile and, subsequent to regeneration, the catalyst is reused for such a hydrogenation, which regeneration comprises the steps of:
   (1) heating the catalyst at a temperature in the range of about 150° C. to about 350° C. and at a pressure in the range of about 0.1 to about 10 mm. of mercury, and, subsequently,
   (2) reducing the same in the presence of hydrogen at a temperature in the range of about 100° C. to about 600° C. for a time sufficient to activate it.

2. A process according to claim 1 wherein the catalyst is heated at an elevated temperature and at a reduced pressure in an inert atmosphere.

3. A process according to claim 1 wherein there is present during a regeneration at least one of nitrogen and helium.

* * * * *